United States Patent [19]

De Corlieu-Ferran

[11] 4,173,342

[45] Nov. 6, 1979

[54] DEVICE FOR SIMULATING A CARD GAME

[76] Inventor: Jeanne De Corlieu-Ferran, 1 rue Scheffer, 75016 Paris, France

[21] Appl. No.: 896,335

[22] Filed: Apr. 13, 1978

[30] Foreign Application Priority Data

Apr. 29, 1977 [FR] France .............................. 77 12986

[51] Int. Cl.$^2$ ............................................. A63B 71/06
[52] U.S. Cl. ................................. 273/148 R; 35/8 B; 340/323 R
[58] Field of Search ........................ 35/8 B; 116/120; 235/92 GA; 273/1 U, 148 R, 149 P; 340/323 R

[56] References Cited

U.S. PATENT DOCUMENTS

| | | | |
|---|---|---|---|
| 2,023,210 | 12/1935 | Potter | 273/149 P |
| 2,486,891 | 11/1949 | Stroh | 273/148 R X |
| 3,876,208 | 4/1975 | Wachtler | 273/138 R |
| 4,072,310 | 2/1978 | Beam | 273/148 R X |

OTHER PUBLICATIONS

Triebwasser, "Computer Games", IBM Technical Disclosure Bulletin, vol. 15, No. 8, Jan. 1973, p. 2624.

"Crowds See Bridge Game on Electric Board"; Popular Mechanics, Apr. 1935, p. 556.

*Primary Examiner*—Harland S. Skogquist
*Attorney, Agent, or Firm*—Young & Thompson

[57] ABSTRACT

The device for simulating a card game played between a number of players and especially a game of bridge comprises a case provided on the front face with luminous information panels corresponding to the number of players and each having a number of card positions corresponding to the number of cards held by a player at the beginning of a game. Any predetermined combination of cards corresponding to any predetermined deal is displayed on each panel. The information loaded in each card position is modified individually in order to indicate that the corresponding card has been played. Playing means comprise a first set of control keys each corresponding to one panel, a second set of control keys each corresponding to one card position and an address coding register connected to both sets of keys in order to define a played card by means of its information panel and its position on the panel.

14 Claims, 3 Drawing Figures

FIG_1

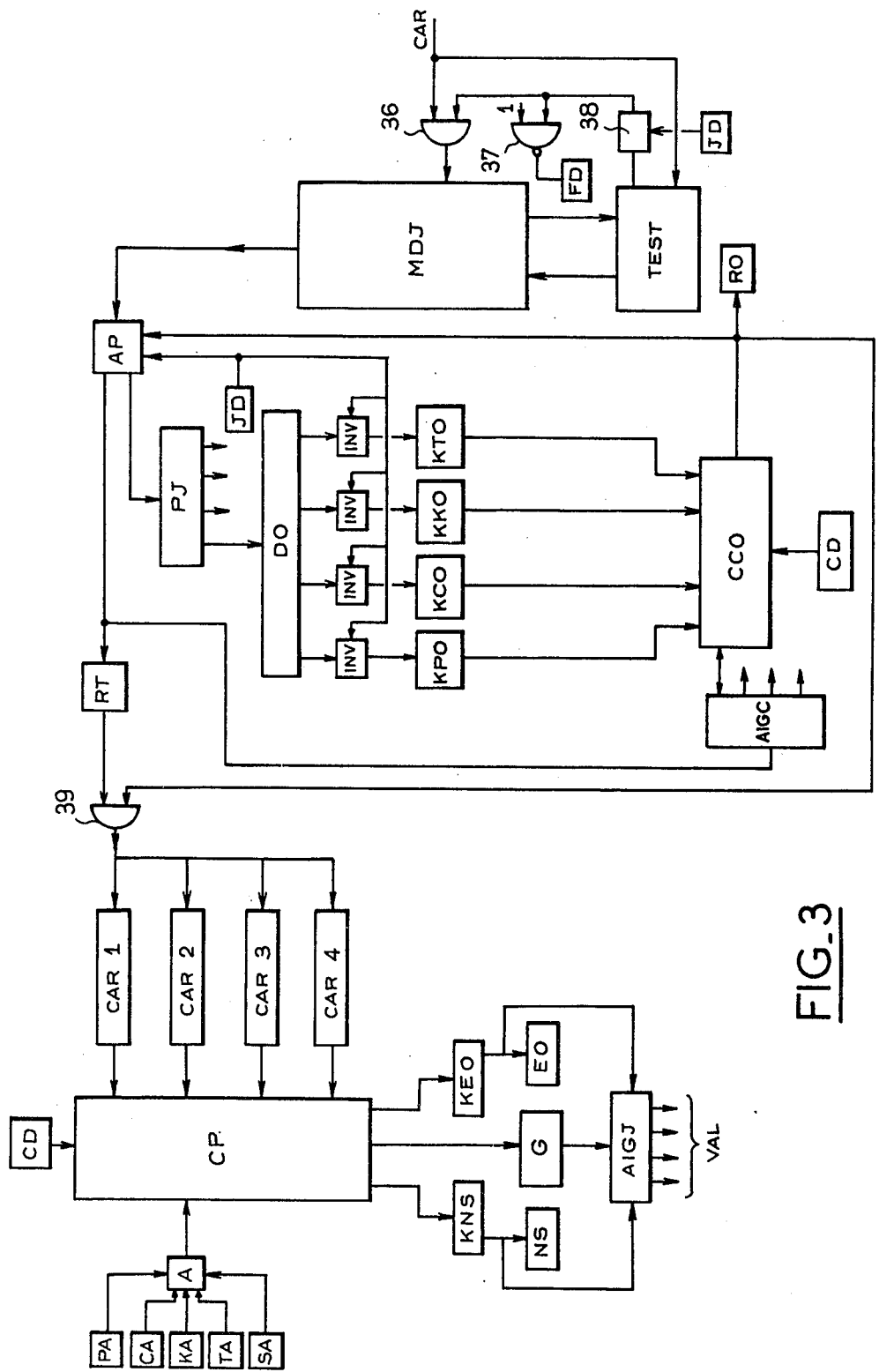
FIG_3

DEVICE FOR SIMULATING A CARD GAME

This invention relates to a device for simulating a game of cards which takes place between a number of players in successive tricks, and especially a game of bridge.

It is known that certain card games such as bridge give rise to various problems which are proposed for the benefit of amateurs either in newspapers or specialized publications. In the majority of instances, a given distribution of cards between the players, or so-called deal, is contemplated at the outset and the problem consists in imagining the development of a game in order to obtain a predetermined result of the game. The accepted practice usually consists in solving these problems with the cards displayed so that the amateur has a full view of all four hands at each instant.

In practice, the amateur can make use of an ordinary deck of cards which he lays out on a table in a suitable manner. However, this procedure calls for a sufficiently large available area and is not practicable in all cases, especially when travelling. Furthermore, the distribution of cards is a relatively long operation.

A further expedient consists in recopying the deal diagram on a sheet of paper, then in striking out the signs as the cards are being played in an imaginary game. This procedure can lead to re-use of the same diagram after a fruitless trial attempt, thus resulting in a disordered appearance which is liable to produce errors.

Devices of the type employed in teaching adaptation systems are also known. These consist of a certain number of interchangeable leaves on which are reproduced selected deals of particular didactic value, the leaves being inserted beneath a movable flap device. The game accordingly consists in finding the order in which the flaps have to be operated in order to simulate the playing of a game which leads to a predetermined result.

Devices of this type are limited to the collection of deals proposed by the maker, with the result that they do not make it possible to solve any desired problem and even less to imagine a new problem.

The aim of the present invention is to provide a simulating device which is highly convenient to use, which can be utilized in a small space and also lends itself to the solution of all problems.

The device in accordance with the invention is intended to simulate a game of cards which takes place between a number of players in successive tricks, and especially a game of bridge. The device comprises a plurality of information media, hereinafter designated as panels, the number of which corresponds to the number of players simulated in the game. Each information panel comprises a number of positions corresponding to the number of cards held by a player at the beginning of a game. Said device further comprises dealing means for displaying on said information panels any predetermined combination of cards corresponding to any predetermined deal and playing means for individually modifying the information loaded in each position aforesaid in order to indicate that the corresponding card has been played. The essential feature of the device lies in the fact that the playing means for indicating that a predetermined card has been played comprise a first set of control keys each corresponding to one of the information panels, a second set of control keys each corresponding to one of the positions in each information panel and an address coding register connected to both sets of keys aforesaid in order to define the predetermined card by means of its information panel and its position in the panel.

The first set of control keys serves to designate a player and the second set designates a card held by this player. When driven by means of said keys, the address decoding stage delivers a signal, for example in the form of an information "word" which entirely defines the position of the card on the card table.

In this embodiment, the dealing means advantageously comprise the two sets of keys aforesaid and the address decoding stage in order to define the position in which any one predetermined card is to appear. The dealing means further comprise a set of control keys each corresponding to one suit, a control key for sequentially displaying the successive values of the cards in a visual display element and control means for loading the suit and the value of the dealt card in the predetermined position.

After having defined the address of the position by means of two first sets of control keys, the suit to which the card belongs is defined by the third set of control keys, whereupon the successive values of the cards are transferred within the visual display element up to the value which it is desired to load. Loading of the card thus defined is then effected in the position aforesaid.

In a preferred embodiment of the invention, each position of the information panels comprises a first luminous alphanumeric element for indicating the value of the corresponding card and a second luminous alphanumeric element for indicating the suit to which said card belongs. The device further comprises electrical control means for displaying in a predetermined position of a predetermined panel an item of information corresponding to the value and to the suit of a given card and thus to effect a predetermined deal.

The device constitutes a luminous board representing a card table and the desired distribution is obtained by means of simple key-pressing operations.

The fact that a card has been played is indicated by extinction of the corresponding position or, in accordance with a more highly improved alternative design, by the lighting-up of a third luminous element for indicating this position.

In one advantageous embodiment of the invention, the device comprises control means for ensuring that the same card has not been assigned to two different positions. Misdeals can thus be immediately corrected.

In a particular embodiment of the invention, said control means comprise a memory which has a number of positions corresponding to the number of cards in the game, each position being loaded with one item of information indicating the player to which the corresponding card is assigned, and said control means further comprise a comparison stage associated with the memory.

Each distributed card is compared with the contents of the memory within the comparison stage. If this comparison shows that the card has already been assigned, a misdeal signal is emitted.

In an improved embodiment of the invention, the device comprises a card comparison stage for automatically determining the winning player of each trick.

In a particular embodiment, said comparison stage comprises a memory stage for storing an item of information corresponding to a predetermined trump suit, logical means for effecting a comparison between the values and the suits of cards played during a trick and visual signal means for indicating the winning player of each trick.

This automatic determination of the player has a significant contributory function in the prevention of errors.

In one application of the device to the game of bridge which is played between four players divided into two sides designated respectively as North-South and East-West, the device comprises counting means connected to the card comparison stage aforesaid in order to count the tricks won by at least one of the two sides.

This arrangement dispenses with the need for any additional writing which would be liable to give rise to an omission.

In accordance with one improved embodiment, the device comprises an "anti-revoke" system for emitting a signal during a given trick when a player who holds at least one card of the suit led by the first player of the trick produces a card of another suit.

Given the fact that this rule is practically the only rule of the game of bridge, material errors which would be liable to vitiate the solution of a problem are thus avoided in a simulated game.

In a particular embodiment, the anti-revoke system comprises four sets of four registers associated respectively with the player information panels, each register of a set being intended to correspond to one suit, automatic control means connected to the dealing means for loading said registers with an item of information which indicates the number of cards belonging to the suit and initially held by the player, means connected to the playing means for automatically reducing by one unit at the time of each trick the register which corresponds to the suit of the card played by the player during said trick, and means for comparing at the time of each trick the suit of the card played by one player with the suit led by the first player of the trick and with the contents of the register corresponding to the suit led.

In all the embodiments specifically adapted to the game of bridge, the device in accordance with the invention comprises means for automatically inhibiting prior to each trick the operation of all the information panels except for the panel corresponding to the winning player of the previous trick, the only uninhibited panel prior to the first trick being the panel corresponding to the West player, said inhibiting means being connected to the comparison stage for the cards played during one trick.

Further distinctive features of the invention will become apparent from the following detailed description, reference being made to the accompanying drawings which are given by way of example and not in any limiting sense, and wherein:

FIG. 3 is another portion of said block diagram.

Reference being made to the figures, the device in accordance with the invention comprises a case 31 (FIG. 1) provided on the front face with a certain number of control and visual display elements connected to an electric circuit which will be described hereinafter.

The visual display elements comprise four information media or so-called panels 32, 33, 34, 35 which relate respectively to fictitious players designated as West, North, East and South. Each information panel is composed of three rows each consisting of thirteen luminous alphanumeric positions. Each position of the top row contains a device of known type for selectively displaying a number or a character representing one of the thirteen card ranks (or values) in the game of bridge. Each position of the central row comprises a device of the same type for displaying a character which represents symbolically one of the four suits. Finally, each position of the bottom row comprises a signal lamp which lights up when the card corresponding to this position has been played. It can readily be understood that all the numerical positions are connected to the electric circuit contained within the case 31.

By way of alternative, consideration can be given to the possibility of dispensing with the bottom row and arranging the circuits so that the positions of the two other rows corresponding to a given card are extinguished when this card is played. However, the disadvantage of this solution lies in the fact that the initial deal cannot be retained in a visible manner.

Figure 1:
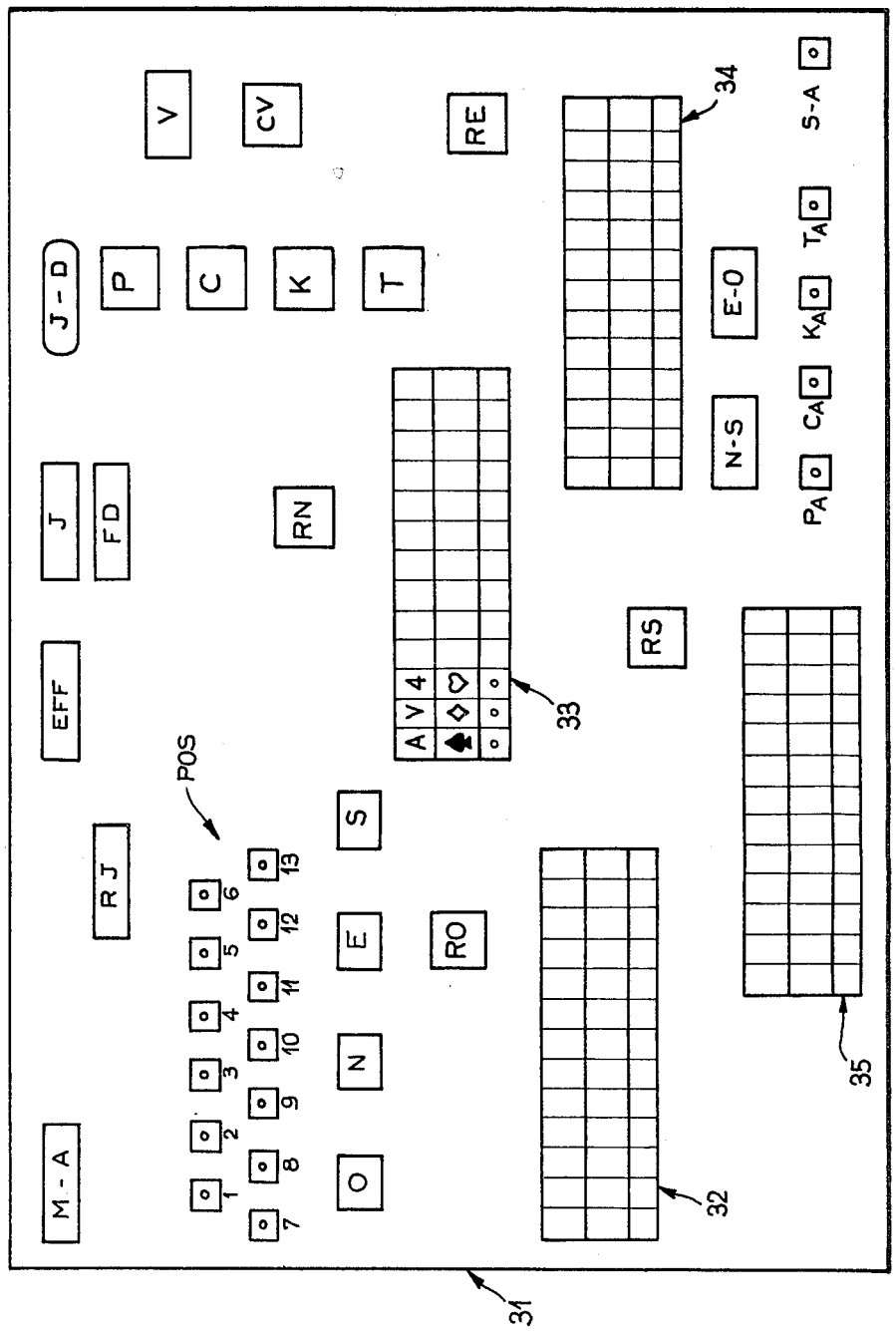
FIG. 1 is a semi-diagrammatic plan view of one embodiment of the invention.

As shown in FIG. 1, a signal lamp RO, RN, RE, RS is located in the vicinity of each of the four information panels. Said signal lamp is intended to light up when a player has revoked or in other words failed to follow suit when he has in fact been holding at least one card of the suit led.

The visual display elements further comprise two luminous totalizers N-S and E-O for the tricks won by the respective sides designed as North-South and East-West as well as a signal lamp FD which lights-up in the event of a misdeal or if a player is required to play a card he does not have.

The control elements comprise an "on-off" switch M-A and a changeover switch J-D in order to connect the circuit either in the playing position or in the dealing position. Said elements further comprise a key J for validating a series of four cards presented by the players as a trick actually taken, and a key EFF for selectively erasing a card resulting from a misdeal or the cards proposed for a trick if the user realizes that his reasoning is erroneous.

A series POS of thirteen numbered keys are capable, in cooperation with a series of four keys O, N, E, S, corresponding to the four fictitious players, of selectively designating any alphanumeric position among all those of the four information panels 32, 33, 34, 35.

Five control keys PA, CA, KA, TA and SA serve to designate a predetermined trump suit. Said keys each comprise a signal lamp which remains lighted-up when the key has been depressed.

Four control keys P, C, K, T serve to designate a suit at the time of the dealing operation. A key CV permits sequential transfer of the successive card values within a visual display device V in order to permit selection of a predetermined value during the dealing operation.

Finally, a control key RJ permits of instantaneous restitution of the deal for a game which may or may not have been completed in order to replay this latter immediately.

Figure 2:
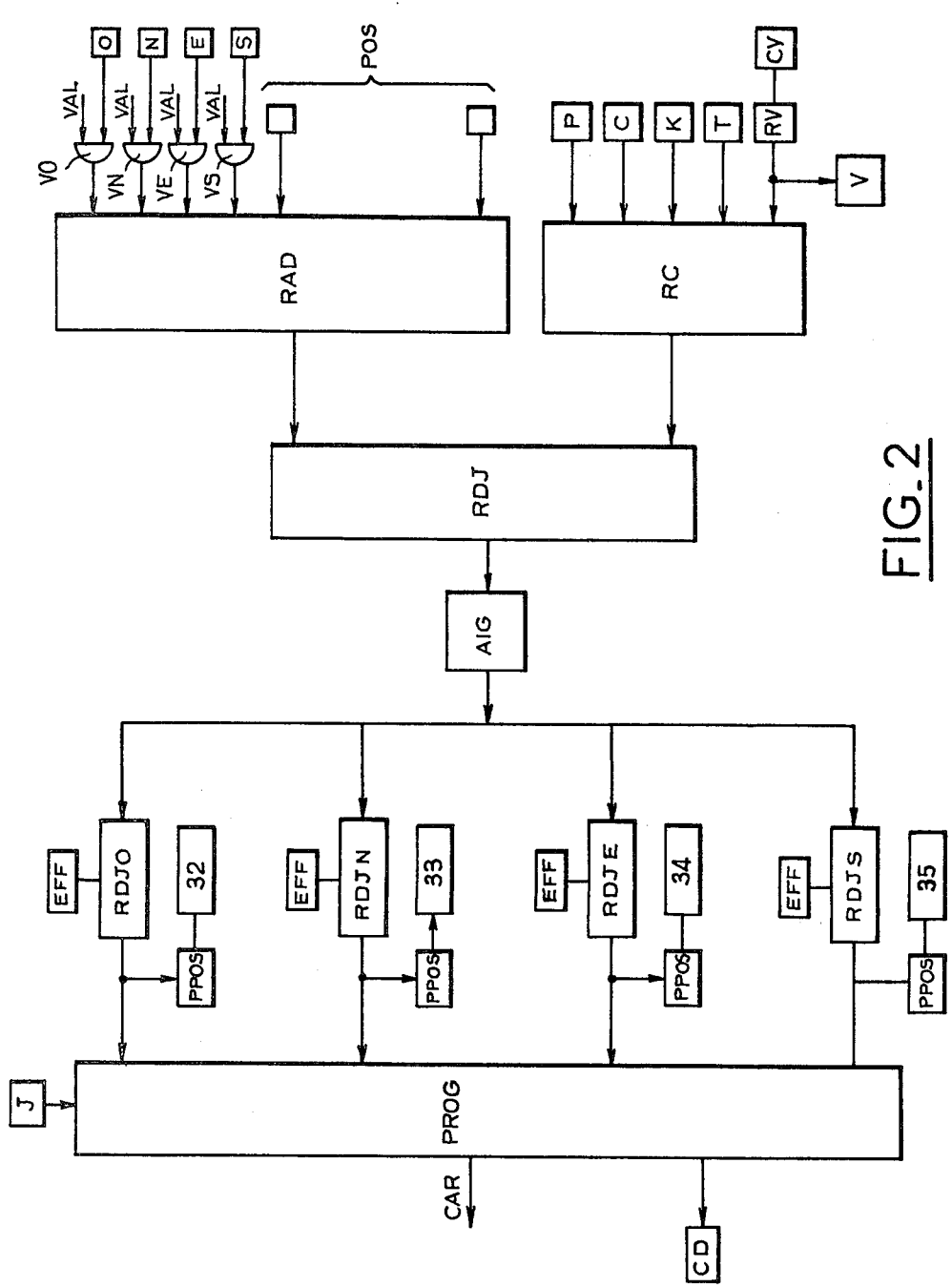
FIG. 2 is a portion of a block diagram relating to the embodiment aforesaid.

Referring now to FIGS. 2 and 3, the electric circuit contained within the case 31 will now be described.

As shown in FIG. 2, the circuit aforesaid comprises an address coding register RAD connected to four control keys O, N, E, S through AND-gates VO, VN, VE, VS which receive in addition a validation signal VAL which will be defined hereinafter. The register RAD is also connected to the thirteen keys of the POS series.

The register RAD comprises seven binary positions, two of which are assigned to identification coding of the player and five of which are assigned to the card position in the information panel corresponding to said player.

A card register RC is connected on the one hand to four control keys P, C, K, T and on the other hand to a five-position card value register RV, the contents of which are subjected to unitary incrementation under the action of the key CV. The register RV is also connected to the visual display device V.

The register RC has seven binary positions, two of which are assigned to indication of the suit and five of which are assigned to indication of the card value.

The registers RAD and RC are connected to a dealing and playing register RDJ having fourteen binary positions which are loaded in parallel by said registers so as to form a word containing the complete indication of a card and the address of the information panel for which said indication is intended. The register RDJ is connected through a switching stage AIG comprising four registers RDJO, RDJN, RDJE, RDJS which are substantially similar to the register RDJ but each assigned to one player and connected to the erasing key EFF.

Each register aforesaid is connected at the output to the corresponding information panel 32, 33, 34, 35 through a coincidence gate PPOS which precisely addresses the contents of the register onto the panel position represented in the word aforesaid which defines the card and its address.

Said registers are also connected at the output to a programming stage PROG which is connected to the control key J and can readily be constructed by anyone skilled in the art. After validation by means of the control key J, said stage has the effect of delivering in sequence the words contained in the registers RDJO, RDJN, RDJE, RDJS in the order in which they have been loaded in said registers and designated by CAR in a testing and storage unit which will now be described with reference to FIG. 3. The programming stage PROG is also adapted to load in a register CD the coded indication of the suit corresponding to the card in which the word CAR was first loaded in the registers RDJO, RDJN, RDJE, RDJS.

The testing and storage unit comprises a checking stage designated as TEST which is intended to receive the word CAR and is connected to a dealing and playing memory MDJ having fifty-two word positions in which are stored the successive words CAR corresponding to cards actually held by the players. The TEST stage is provided in a manner known per se with means for scanning the memory MJD and comparing the words contained therein with the word CAR which it receives.

Said stage delivers a one-output binary signal when the new word CAR does not appear in the memory MDJ. This signal is applied to an AND-gate 36 which also receives the word CAR and the output of which drives the memory MDJ. Said signal is applied in parallel to a reversing AND-gate 37 to which the one-output signal is also applied continuously and the output of which controls the signal lamp FD. However, said binary signal derived from the TEST stage passes through a reversing stage 38, said stage being connected to the changeover switch J-D which reverses said signal when said changeover switch is in the "play" position.

The operation of this unit can readily be understood. In the "dealing" position, absence of the word CAR from the memory MDJ causes the emission of a one-output signal from the TEST stage which opens the gate 36 in order to permit storage of said word in the memory. On the contrary, if the card has already been distributed earlier, the word CAR is in the memory MDJ and the signal emitted by the TEST stage is "zero". The gate 36 inhibits storage and the gate 37 actuates the misdeal signal lamp FD.

In the "play" position, the reversing stage 38 reverses the signal emitted by the TEST stage and the operation is reversed. Should it be desired to play a card which has already been played, the gate 36 remains closed and the signal lamp FD lights up. On the contrary, if the card has not yet been played, the gate 36 opens in order to permit erasure of the word CAR within the memory MDJ.

The word CAR which is written or read in the memory MJD is then applied through a programmed switching device AP which will be described hereinafter to a coincidence gate PJ which directs the word towards one of four discriminators. For the sake of enhanced clarity, only the West DO discriminator has been illustrated. This discriminator emits a one-output signal towards one of four counters KPO, KCO, KKO, KTO which thus totalize the number of cards of each suit held by each player. However, the counters are driven through a reversing stage INV which is connected to the changeover switch J-D which reverses the increment to the "play" position. The counters relating to each player deliver an output signal respectively to four suit comparators. In this case, only the West CCO comparator is illustrated. Each comparator is connected to the register CD is order to receive the indication of the suit of the first card played in the trick (or suit led).

The programmed switching device AP is connected to the changeover switch J-D and arranged in a manner known per se so as to transfer the word CAR solely to the gate PJ when said changeover switch is in the "deal" position. It is understood that, during the deal, any one counter corresponding to any one player is incremented by one unit when said player receives a card of this suit. On the contrary, in the "player" position, the word CAR is transferred to a switching device AIGC which addresses this latter to the suit comparator of the player concerned, namely a comparator CCO in the example which is illustrated. This comparator compares the suit of the card which is played with the suit led and derived from the register CD and with the contents of the counter for said suit. If the suit is different from the suit led and if the corresponding counter is not at zero, the comparator CCO actuates the revoke signal lamp RO to which it is connected.

The word CAR which is read in the memory MDJ while being applied at the same time to the switching device AIGC is also applied to a comparison stage in order to determine the winner of the trick. To this end, the word passes through a monstable device RT having a period which is so determined as to be longer than that of the revoke control operation mentioned earlier.

Moreover, the word CAR passes on the downstream side through and AND-gate 39 which is opened only by the reversed output signal from the comparator CCO. It is apparent that the word CAR will reach the comparison stage only if the player who has played this latter has not revoked. Finally, the output of the comparator CCO is connected to the programmed switching device AP in order to cause this latter to apply the word CAR to the gate PJ if no revoke has occurred in order to decrement the corresponding counter in a suitable manner.

The comparison stage comprises four registers CAR 1, CAR 2, CAR 3, CAR 4, which receive the successive words CAR of a trick in the order in which they appear.

These registers are connected to a comparator CP which also receives the contents of a memory A. Said memory contains the indication of a trump suit, is controlled by the keys Pa, CA, KA, TA and SA, and is connected to the register CD in order to receive the indication of the suit led.

It is within the capacity of anyone versed in the art to determine the internal structure of the comparator CP in order to ensure that this latter delivers at the output a signal which indicates the winning player of the trick, it being known that this player is the one who has played the highest card in the trump suit or, failing this, in the suit led by the first player of the trick.

This indication of the winning player is stored in a memory G. In addition, the comparator increments one of two counters KNS and KEO corresponding respectively to the North-South and East-West sides, whilst the incremented counter is that of the winning player. These counters are connected respectively to the visual display elements NS and EO.

The contents of the memory G are applied to a player switching device AIGJ which delivers the validation or enabling binary signal VAL to one of the gates VO, VN, VE, VS corresponding to the winning player in order to allow this latter to play the following trick first. By virtue of known means (not shown), the fact of depressing one of the keys O, N, E, S automatically applies the signal VAL to the following gate in the circular order mentioned in the foregoing.

It is further intended to apply the signal VAL to the four gates unconditionally when the changeover switch J-D is in the "deal" position.

Finally, a connection between the counters KNS and KEO and the switching device AIGJ serves to apply the signal VAL to the gate VO when these two counters are at zero, that is to say at the first trick.

The device further comprises a memory MDJ 2 (not shown in the drawings) which recopies the contents of the memory MDJ but does not undergo any erasure. This memory which is connected to the control key RJ makes is possible to reproduce a deal instantaneously so as to permit immediate replay of a game.

In order to use the device, the initial operation consists in loading a deal. To this end, when the changeover switch J-D has first been placed in the "deal" position in respect of each card, one depresses the particular key O, N, E, S corresponding to the player for which said card is intended and the key of the series POS which indicates the desired location of said card on the information panel of that player. Any one required key P, C, K, T is then pressed in order to designate the suit. Finally, by pressing the key CV, the successive values of the cards are transferred up to the value which has been selected.

These indications are loaded in the registers RAD and RC, then in the register RDJ in which they form the word CAR.

By means of the switching device AIG, the word CAR is transferred into one of the registers RDJO, RDJN, RDJE, RDJS which corresponds to the player selected and, at the same time, into the information panels 32, 33, 34, 35 on which visual control can be effected. If an error is found, erasing is accordingly carried out by means of the control key EFF. If there in no error, operation of the control key J validates the card dealt by permitting storage of the word CAR within the memory MDJ by means of the misdeal control operation performed by the TEST stage as stated earlier. The memory MDJ 2 is loaded progressively at the same time as the memory MDJ. Successive loading of the 52 cards is thus carried out.

As each card is dealt, the counters corresponding to each suit and to each player such as KPO, KCO, KKO and KTO are incremented by one unit, the signal CAR being applied solely to the gate PJ through the programmed switching device AP.

In order to play, the changeover switch J-D is placed in the "play" position. The operating key corresponding to the first player is then pressed, namely West at the time of the first trick, or the winning player of the previous trick. The action of the signal VAL prevents any faulty operation. The control key of the series POS which designates a card in the information panel corresponding to the player is also pressed. The word thus formed in the register RAD undergoes transition into the register RDJ and is directed through the switching device AIG towards the information panel aforesaid in order to light-up a luminous point in the bottom row.

The same procedure is adopted for the four cards of any one trick. After checking and careful thought, one presses the control key J which enables the programmer PROG to transfer the four words CAR to the memory MDJ in the order of play in order to erase these latter after control by the TEST stage. However, the memory MDJ 2 does not undergo any erasure.

By transferring the word CAR to the switching device AIGC, the programmed switching device AP initiates the revoke control operation. If revoking does not take place, the signal lamp RO lights-up and the word CAR remains blocked by the gate 39 without driving the comparison stage. If revoking does not take place, the output signal of the comparator CCO enables the switching device AP to apply the word CAR to the gate PJ so as to decrement the corresponding counter.

At the same time, the gate 39 opens in order to allow the word CAR to drive the comparison stage, the revoke control time having been set by the monostable device RT.

The comparator CP determines the winning player of the trick as indicated earlier and loads this indication in the register G which drives the switching device AIGJ and will transmit the validation signal VAL (enabling signal) to the winning player control O, N, E, S, with the result that this player can be first to play in the following trick.

At the same time, the comparator CP increments by one unit the counter KNS or KEO of the side to which the winning player belongs, the contents of said counter being transmitted to the visual display elements NS, EO.

If the user notices in the course of a game that he has made a wrong move in solving a problem and wishes to replay the same deal immediately, it is not necessary to redistribute the cards one by one. It is only necessary for the user to press the key RJ in order to transfer into the memory MDJ the contents of the memory MDJ 2 which have not been erased. It can be readily understood that the control key RJ is connected to the counters KNS and KEO in order to reset these latter to zero.

Each suit counter such as the counters KPO, KCO, KKO and KTO is connected to a register (not shown) which duplicates its contents but only in the deal position. In consequence, the contents of these counters are stored at the maximum "end of deal" value without undergoing decrementation within the registers. Operation of the control key RJ makes it possible to retransfer the contents of the registers into the respective counters. Complete regeneration of the device is thus ensured.

The device hereinabove described makes it possible to solve any bridge problem in a convenient manner while making use of equipment which is both compact and easy to manipulate. Errors of operation are avoided or indicated and can be corrected immediately without any need to start either a deal or a game all over again.

As can readily be understood, the invention is not limited to the examples described in the foregoing and many different presentations of the first two embodiments could accordingly be devised. In regard to the third embodiment, it is apparent that many alternative forms of presentation of the logic circuits can be conceived. Finally, this device can be employed for any game other than bridge by means of a simple adaptation.

I claim:

1. A device for simulating a game of cards which takes place between a number of players in successive tricks and especially a game of bridge, comprising a number of information panels corresponding to the number of players simulated in the game, provision being made on each panel for a number of positions corresponding to the number of cards held by a player at the beginning of a game, and further comprising dealing means for displaying or said information panels any predetermined combination of cards corresponding to any predetermined deal and playing means for individually modifying the information loaded in each position aforesaid in order to indicate that the corresponding card has been played, wherein the playing means for indicating that a predetermined card has been played comprise a first set of control keys each corresponding to one of the information panels, a second set of control keys each corresponding to one of the positions in each information panel and an address coding register connected to both sets of keys aforesaid in order to define the predetermined card by means of its information panel and its position in said panel.

2. A device according to claim 1, wherein the dealing means for displaying on a predetermined position of a predetermined panel an item of information corresponding to a dealt card comprise the aforementioned two sets of control keys and the address coding register in order to define the predetermined position, a set of control keys each corresponding to one suit, a control key for sequentially displaying the successive values of the cards in a visual display element, a card coding register, and control means for loading the suit and the value of the dealt card in said predetermined position.

3. A device according to claim 1, wherein each position of the information panels comprises a first luminous alphanumeric element for indicating the value of the corresponding card and a second luminous alphanumeric element for indicating the suit to which said card belongs, the device being such as to comprise electric control means for displaying on a predetermined position of a predetermined panel an item of information corresponding to the value and to the suit of a dealt card and thus to effect a predetermined deal.

4. A device according to claim 3, wherein the means for indicating that a predetermined card has been played comprise means for selectively causing the extinction of the corresponding position.

5. A device according to claim 3, wherein the means for indicating that a predetermined card has been played comprise for each position a third luminous element and means for selectively causing said element to light-up.

6. A device according to claim 3, wherein said device comprises control means for ensuring that the same card has not been assigned to two different positions.

7. A device according to claim 6, wherein the control means comprise a memory which has a number of positions corresponding to the number of cards in the game, each position being loaded with one item of information indicating the player to which the corresponding card is assigned, said control means being further provided with a comparison stage associated with said memory.

8. A device according to claim 3, wherein said device comprises a card comparison stage for automatically determining the winning player of each trick.

9. A device according to claim 8, wherein the card comparison stage comprises a memory stage for storing an item of information corresponding to a predetermined trump suit, logical means for effecting a comparison between the respective values and suits of cards played during a trick and visual signal means for indicating the winning player of said trick.

10. A device according to claim 9 and specially intended for the game of bridge which is played between four players divided into two sides designated respectively as North-South and East-West, wherein said device comprises counting means connected to the card comparison stage aforesaid in order to count the tricks won by at least one of said sides.

11. A device according to claim 10, wherein said device comprises an "anti-revoke" system for emitting a signal during a given trick when a player who holds at least one card of the suit led by the first player of the trick produces a card of another suit.

12. A device according to claim 11, wherein the anti-revoke system comprises four sets of four counters associated respectively with the information panels of the players, each counter of one set being intended to correspond to one suit, automatic control means connected to the dealing means for loading said counters with an item of information which indicates the number of cards belonging to the suit and initially held by the player, means connected to the playing means for automatically reducing by one unit at the time of each trick the counter which corresponds to the suit of the card played by the player during said trick, and means for comparing at the time of each trick the suit of the card played by one player with the suit led by the first player of the trick and with the contents of the counter corresponding to the suit led.

13. A device according to claim 10, wherein said device comprises means for inhibiting prior to each trick the operation of all the information panels except the panel corresponding to the winning player of the previous trick, the only uninhibited panel prior to the first trick being the panel corresponding to the West player, said inhibiting means being connected to the comparison stage for the cards played during one trick.

14. A device according to claim 7, wherein said device comprises means for storing the entire deal and control means for instantaneously reloading the information panels from said storage means.

* * * * *